United States Patent [19]

Furrer et al.

[11] Patent Number: 5,031,305

[45] Date of Patent: Jul. 16, 1991

[54] APPARATUS FOR MANUFACTURING ELECTRICAL PINS

[75] Inventors: Heinrich K. Furrer; William R. de Oliveira, both of Braganca Paulista-San Paulo, Brazil

[73] Assignee: AMP Incorporated, Harrisburg, Pa.

[21] Appl. No.: 305,874

[22] Filed: Feb. 2, 1989 (Under 37 CFR 1.47)

[30] Foreign Application Priority Data

Feb. 29, 1988 [BR] Brazil .......................... PI8800864[U]

[51] Int. Cl.$^5$ .............................................. B23P 19/00

[52] U.S. Cl. ....................................... 29/747; 29/882; 72/70; 72/92

[58] Field of Search ................. 29/874, 869, 876, 882, 29/747; 72/70, 72, 92, 93; 140/105

[56] References Cited

U.S. PATENT DOCUMENTS

| | | | |
|---|---|---|---|
| 1,309,523 | 7/1919 | Hosford | 29/882 X |
| 1,632,703 | 6/1927 | Humphris | 72/92 X |
| 3,686,912 | 8/1972 | Beletsky et al. | 72/70 |
| 4,836,006 | 6/1989 | Brown | 29/882 X |

FOREIGN PATENT DOCUMENTS

| | | | |
|---|---|---|---|
| 0253753 | 1/1988 | European Pat. Off. | |
| 8709559 | 1/1988 | Fed. Rep. of Germany | |
| 55-147446 | 11/1980 | Japan | 72/70 |
| 1580773 | 12/1980 | United Kingdom | |

*Primary Examiner*—Carl J. Arbes
*Attorney, Agent, or Firm*—William B. Noll; Thomas G. Terrell

[57] ABSTRACT

Apparatus for making electrical pins with frusto-conical end portions, comprises a wire feed station for the supply of a length of metal wire to a wire severing station at which a wire severing wheel severs the wire into pin blanks, in cooperation with a fixed bushing. The wheel pushes the blanks along a track to a pin blank rolling station at which the end portion of the pin blanks are rolled to frusto-conical shape between a pin rolling fixture and a pin rolling wheel having mounted for rotation relative thereto, a pin blank entraining ring having pin blank receiving grooves.

8 Claims, 8 Drawing Sheets

APPARATUS FOR MANUFACTURING ELECTRICAL PINS

BACKGROUND OF THE INVENTION

This invention relates to the manufacture of electrical pins which are tapered at each end.

Such pins, which are commonly made of brass and are used as pin terminals for insertion into holes in circuit boards for connection to conductors thereof, are currently manufactured by two main methods. One of these methods comprises milling in a metal wire a series of opposed tapered sections spaced from each other lengthwise of the wire and severing the wire between the tapered sections of each opposed pair to provide the pins. In the other method, the tapered sections are produced by a coining operation as disclosed in GB-A-1,580,773. Each method is relatively slow to perform, bearing in mind that the pins need to be mass produced, and the tips of the pins so made tend to be burred.

SUMMARY OF THE INVENTION

According to the present invention, the pins are formed at a pin blank rolling station by cold rolling the end portions of cylindrical pin blanks severed from a length of metal wire. Briefly stated, said rolling is achieved by cooperation between a pin blank rolling wheel and a pin blank rolling fixture having a smooth, arcuately concave, pin blank supporting surface, to roll the ends of the pin blanks to frusto-conical shape between pin blank forming surfaces of the wheel and the fixture as the pin blanks are rolled along said concave surface as the wheel is rotated.

The pin banks may be produced from a length of wire which is fed to a severing station at which the blanks are severed from the wire, and from which they are supplied by way of a feed track, to the pin blank rolling station. The severing station may comprise a wire severing wheel, having thereon a series of peripheral teeth which, as the severing wheel is rotated, shear pin blanks from the wire in cooperation with a fixed bushing through which the wire is fed so that its end engages a wire stop positioned upstream, in the wire feed direction, of the wire severing wheel. The teeth of the wire severing wheel may be arranged to transfer the severed blanks to the feed track so that a row of pin blanks juxtaposed thereon is progressively moved forward to position each blank in turn in a respective pin blank receiving groove of the blank forming wheel. The wire is preferably provided with a film of oil there over to assist the adhesion together of the blanks in the row and each leading blank of the row may be urged into a respective groove of the blank forming wheel, by means of a blast of compressed air.

A pin manufactured in the manner described above, has at each end thereof a frusto-conical end portion into which extends a conical recess defined by a peripheral skirt of the pin material thrown up by the rolling operation, the tip of the pin being smooth and free from burrs. The pins can also be rapidly and continuously produced, as the end portions of a substantial number of the pins are formed simultaneously at the pin rolling station.

The frusto-conical end portions provide adequate lead surfaces, for guiding the pins into holes in workpieces, for example, circuit boards, and the smooth tips of the pins facilitate the entry of the pins into the holes.

For a better understanding of the invention and to show how it may be carried into effect, reference will now be made by way of example to the accompanying drawings.

DETAILED DESCRIPTION OF PREFERRED EMBODIMENT

Figure 1:
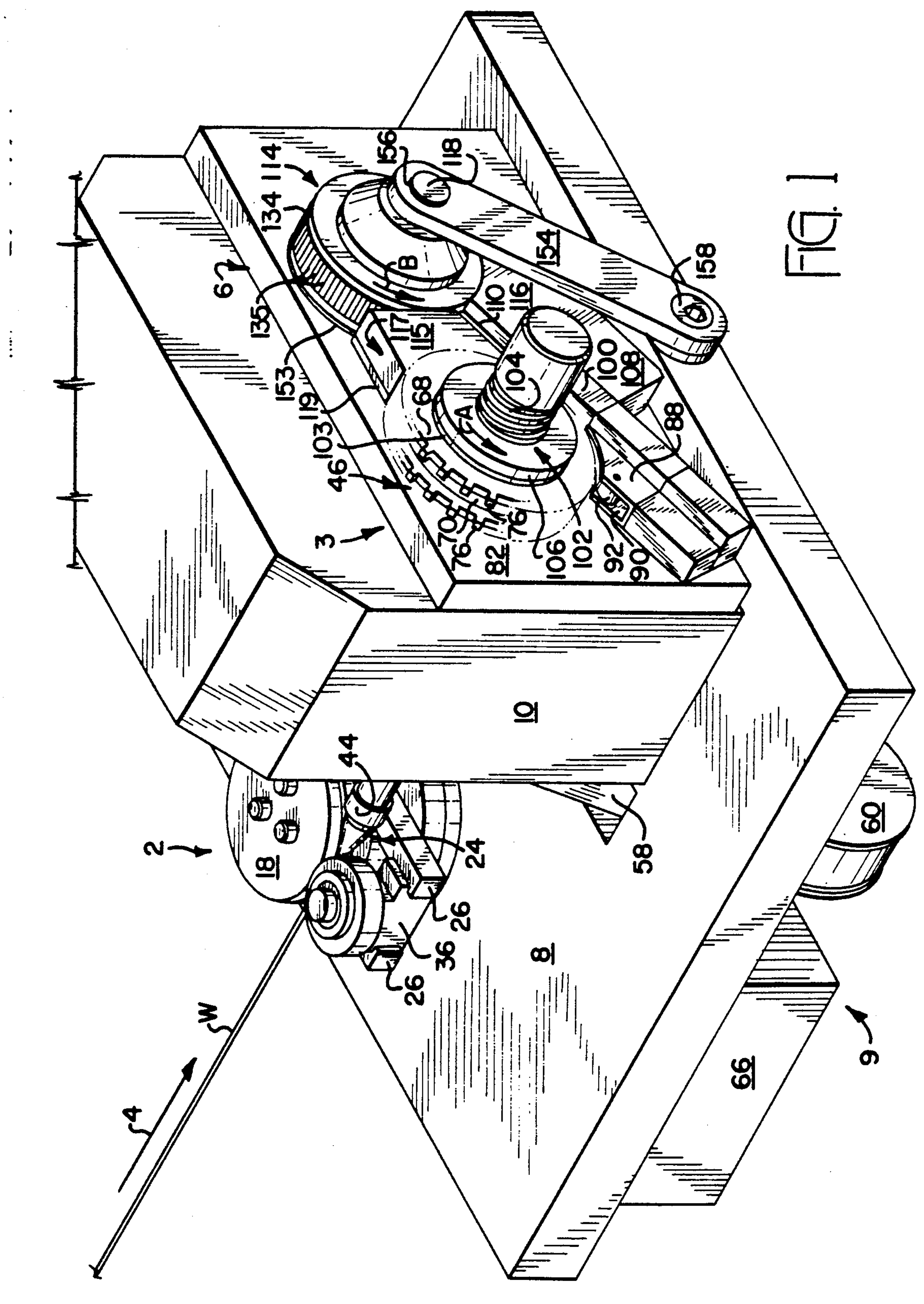
FIG. 1 is an isometric view of electrical pin forming apparatus.

As best seen in FIG. 1, the pin rolling apparatus comprises a wire feed station 2, a wire severing station 3, and a pin blank rolling station 6, station 2 being mounted to a base plate 8 of a frame, generally referenced 9, of the apparatus and the stations 3 and 6 being mounted to a subframe 10 on the plate 8.

As best seen in FIGS. 1 and 3 to 5, the wire feed station 2 comprises a bearing block 12 mounted on the plate 8 and rotatably supporting a vertical shaft 14 to the top of which is secured, by means of fasteners 16, a driven wire feed roll 18 having a wire receiving peripheral groove 20 (FIG. 4), the shaft 14 being driven by a constant speed, continuously operated electric motor 22 mounted below the plate 8. There extends horizontally through the block 12, a bifurcated slide 24 having arms 26 straddling the shaft 14 and being connected at one end by a yoke 28 threadedly receiving a feed roll pressure adjustment grub screw 30 carrying a coil spring 32 received in a bore 34 (FIG. 4) in the block 12. The arms 26 are connected at their other ends by a supporting bush 36 to which is mounted by means of a vertical bolt 38, an interengaging bearing bush 39 to which is in turn mounted an idle roll 40 on a ball bearing 41, for rotation about the axis of the bolt 38. The periphery of the roll 40 is arranged to engage a metal, for example, brass, wire W extending through the groove 20 from a wire supply reel and wire straightening rolls (not shown) and to which a film of oil has been applied at a station (not shown). The grub screw 30 is adjustable to control the tension of the spring 32, so as in turn to control the force applied to the wire W by the feed rolls 18 and 40. The wire W is guided between the rolls 18 and 40 by means of a first horizontal tubular wire guide 42 secured to the plate 8 and passes, from the rolls 18 and 40, through a second, horizontal, tubular wire guide 44 fixed in a backplate 45 of the subframe 10, to the wire severing station 3.

As best seen in FIGS. 1, 2, 3 and 6, the station 3 comprises a wire severing wheel 46 rotatably mounted on a horizontal shaft 48 which is journaled in a front plate 49 of the subframe 10. The shaft 48 is connected by way of gear wheels 50 and 52 (FIG. 3) in the subframe 10 to a shaft 54 journaled in the backplate 45. A sprocket wheel 56 on the shaft 54, is connected by way of a toothed drive belt 58, to a further sprocket wheel 60 on a shaft 62 running in a bearing assembly 64 secured beneath the plate 8. The shaft 62 is coupled to the spindle of a continuously operated, constant speed electrical motor 66, mounted beneath the plate 8, and which rotates the wheel 46 in the direction of the arrow A in FIG. 1. The wheel 46 comprises two halves 68 and 70 secured together by pins 72 and defining a groove 74 extending about the whole periphery of the wheel 46. Each wheel half 68 and 70 has an array of rectangular teeth 76 evenly distributed about its periphery, each tooth 76 of the wheel half 68 being aligned with, and opposite to, a corresponding tooth of the wheel half 70 in the axial direction of the wheel 46.

Figure 2:
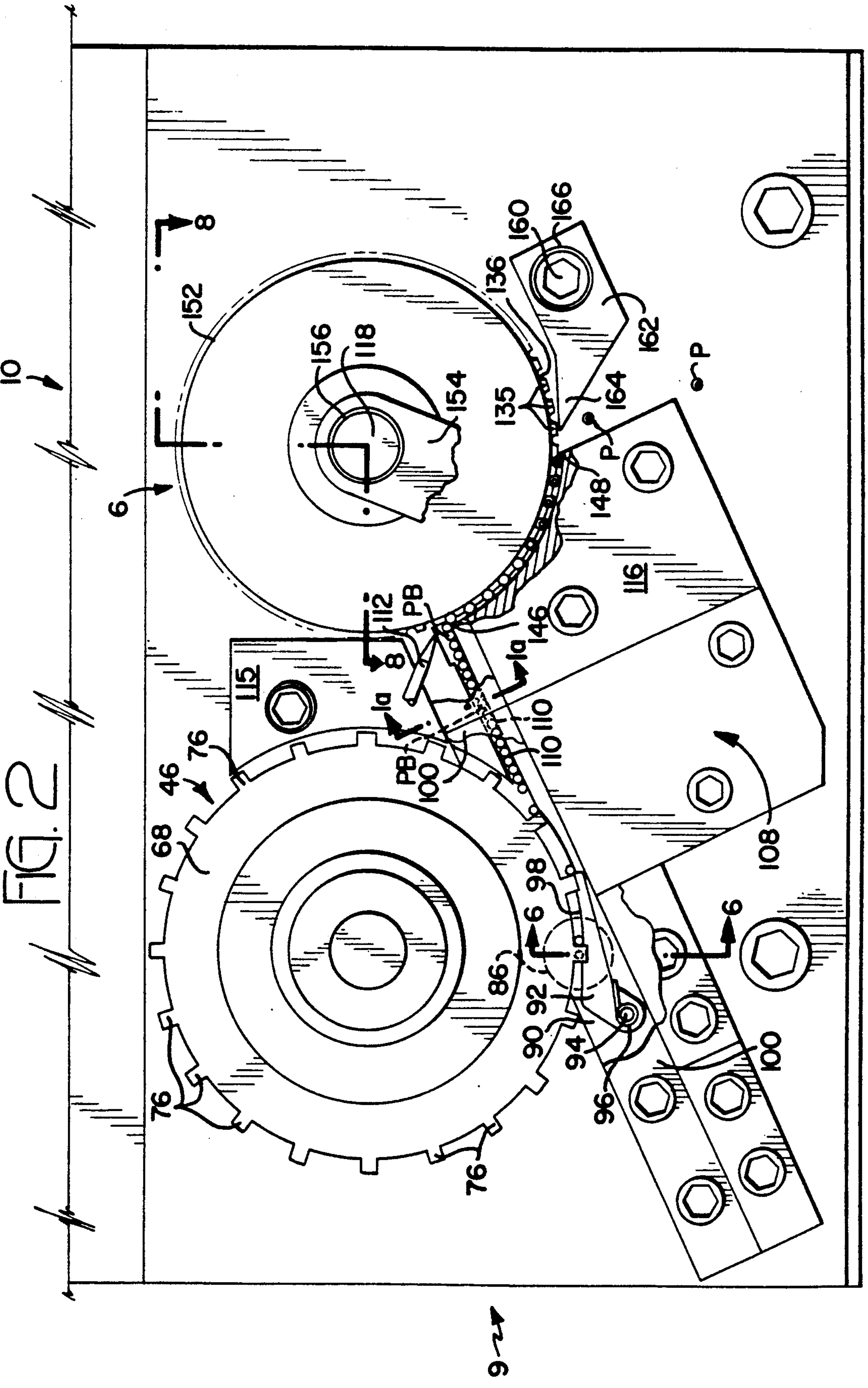
FIG. 2 is a front view of the apparatus, with parts omitted.
Figure 3:
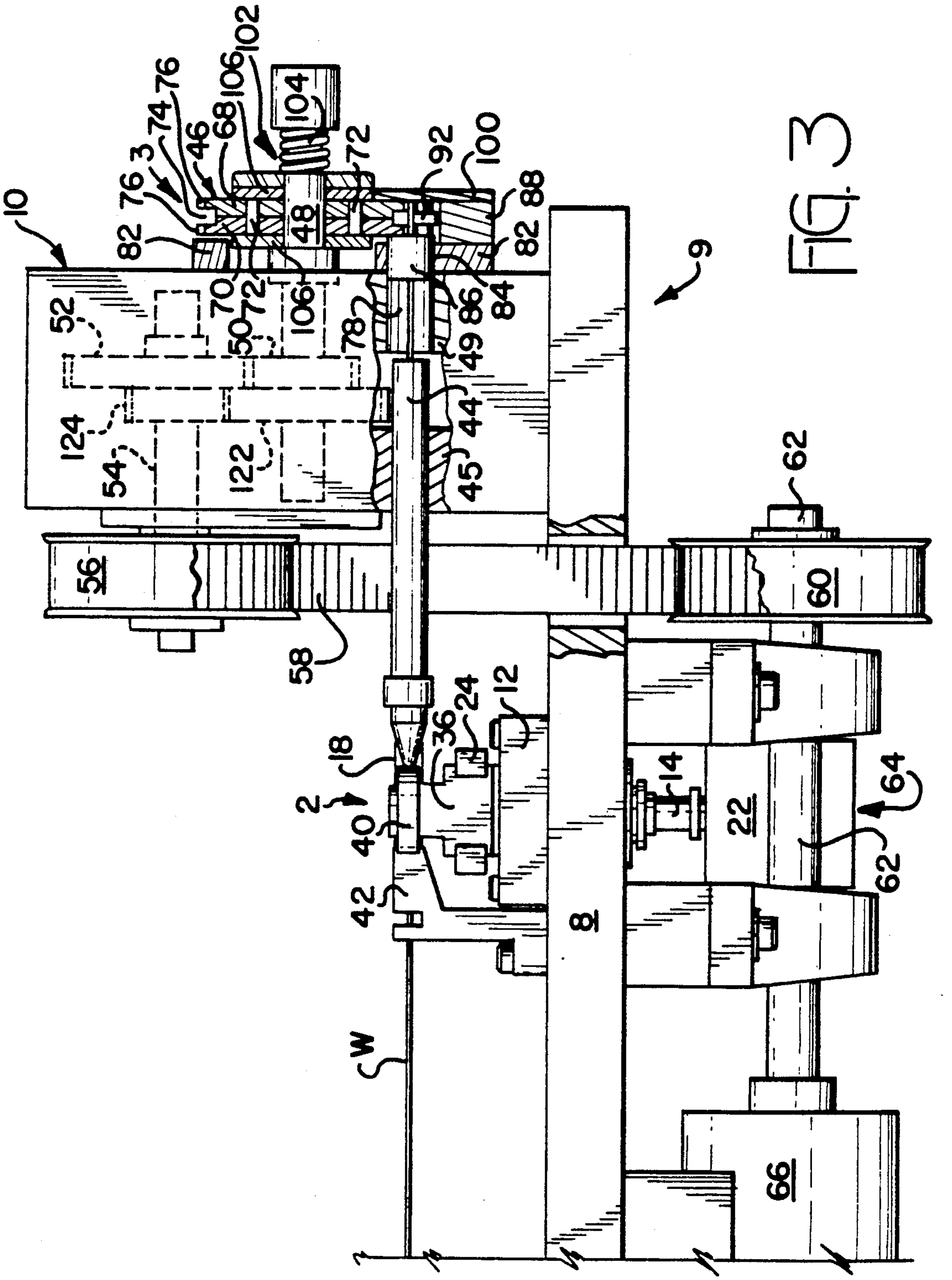
FIG. 3 is a side view of the apparatus shown partly in section.
Figure 4:
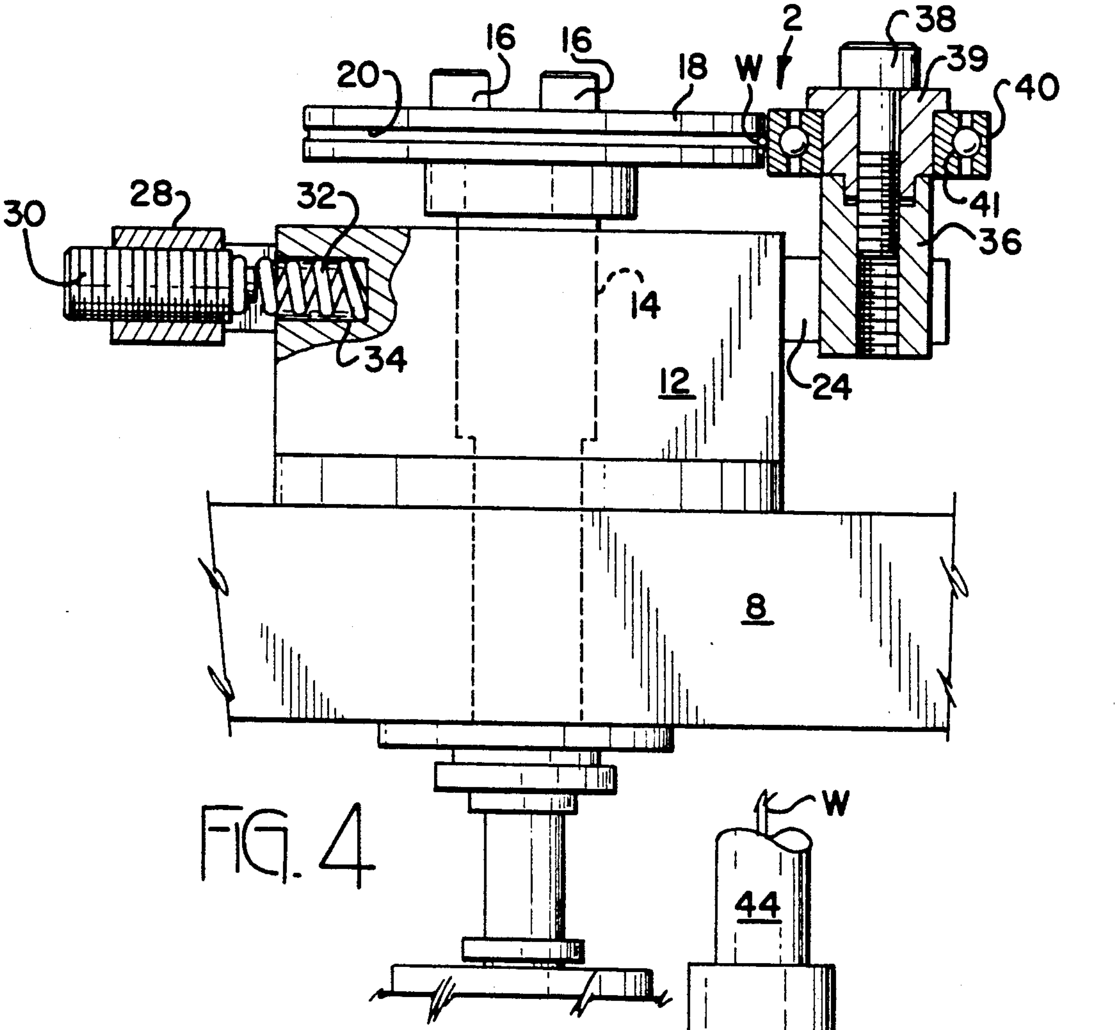
FIG. 4 is a view taken in the direction of the arrow 4 in FIG. 1.
Figure 5:
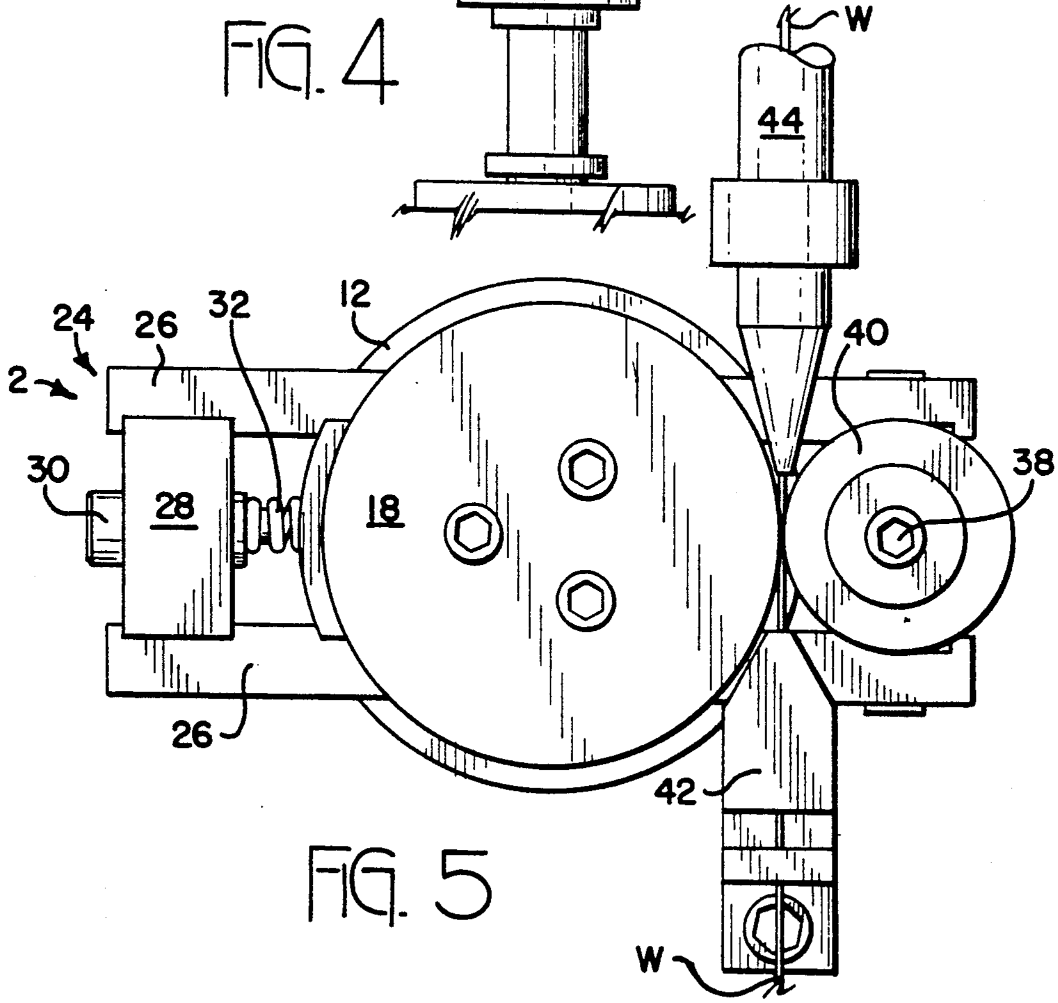
FIG. 5 is an enlarged, top plan view of a wire feed station of the apparatus.

The wire W extends from the wire guide 44 through a horizontal bore 78 in the front plate 49 of the subframe 10, to which is fixed a face plate 82 having a bore 84 communicating with the bore 78, and in which is secured a wire shear bushing 86. A block 88 secured to the plate 82 beneath the wheel 46 is formed with a groove 90 (FIG. 6), opening towards, and being aligned with, the peripheral groove 74 of the wheel 46. A pin blank hold down finger 92 (best seen in FIG. 2), is mounted in the groove 90 on a pivot pin 94 in the block 88 and is urged in an anticlockwise (as seen in FIG. 2) sense by means of a spring 96 on the pin 94, so that a pin hold down surface 98 of the finger 92 is urged inwardly of the groove 74 of the wheel 46. Fixed to the forward side of the block 88 is an elongate wire end stop plate 100 which extends obliquely, alongside the wheel half 68 in generally tangential relationship thereto and with respect to which the wheel 46 is rotatable. The wheel 46 is connected to the shaft 48, for rotation therewith, by means of a slip clutch 102 having a spring 104 urging clutch plates 106 against the wheel 48.

Spacer plates (not shown) may be interposed between the wheel halves 68 and 70 to adjust the wheel 46 for pin length.

There is fixed to the front plate 49 of the subframe 10, a block 108 the upper surface of which defines the downstream part of a pin blank feed track 110 extending generally tangentially of the wheel 46, for guiding pin blanks PB sheared from the wire W at the station 3, as will be described below, to the station 6.

As best seen in FIGS. 1, 1A, 2 and 7–10, the station 6 comprises a pin blank rolling wheel 114 on a shaft 118 and a cooperating pin blank rolling fixture in the form of a block 116 defining the downstream part of the track 110 and above which is mounted an air blast nozzle 112. The block 116 is bolted to the plate 82. A pin blank guide assembly 117 fixed to the plate 82 comprises a guide block 115 from which depends a guide plate 119 (FIGS. 1 and 1A), bounding the rearward side of the track 110, the lower face 121 of the block 115 extending proximate to the track 110 and there above. The forward side of the track 110 is bounded by the plate 100. The face 121 thus confines pin blanks PB on the track 110 against riding up, the plates 100 and 119 confining them against axial movement on the track 110.

The wheel 114 8s keyed to the shaft 118, which extends through the plate 82, and is journaled in bearings 120 in the front plate 49. The shaft 118 is driven by the shaft 54 by way of a gear wheel 122 keyed to the shaft 118 and a gear wheel 124 keyed to the shaft 54 (FIG. 3), so that the wheel rotates in the direction of the arrow B in FIGS. 1 and 7.

Figure 8:
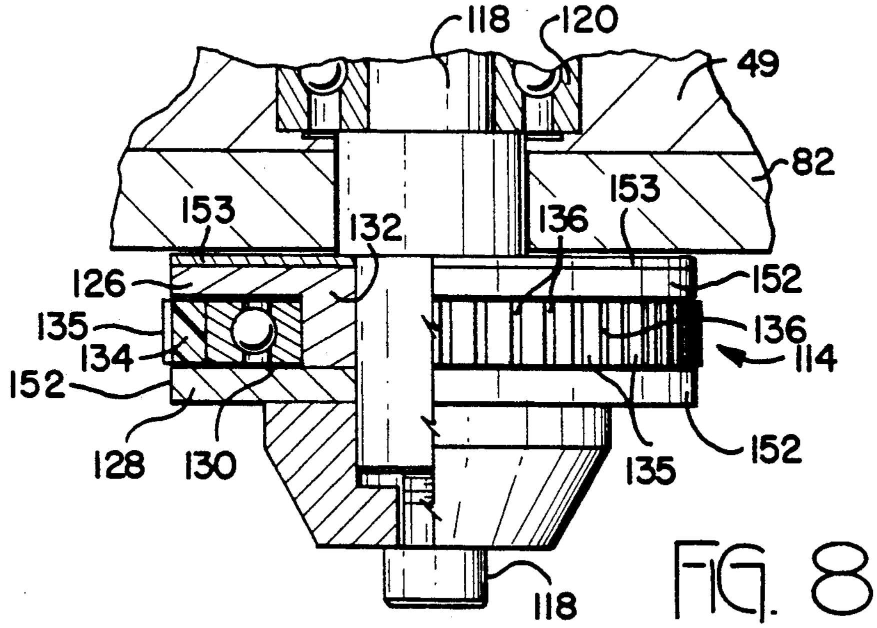
FIG. 8 is a view taken on the lines 8—8 of FIG. 2.

The wheel 114 comprises, as best seen in FIG. 8, two parts 126 and 128 which cooperate to define a peripheral groove 130 in which is seated a ring bearing 132 which extends about the whole periphery of the wheel 114 and to which is attached a resilient pin blank entraining ring 134, made for example of polyurethane. The peripheral forming surfaces 152 of the parts 126 and 128 are cylindrical and are thus coaxial with the axis of the shaft 118. The surfaces 152 provide pin rolling surfaces as will be described below. The ring 134 is freely rotatable on the bearing 132, about the axis of the shaft 118, independently of the wheel parts 126 and 128. The ring 134 has extending about its periphery, a series of constantly spaced pin blank entraining ribs 135, which project beyond the cylindrical surfaces 152 of the wheel parts 126 and 128, and define pin blank receiving grooves 136, the series of ribs 135 and grooves 136 extending about the entire periphery of the wheel 114, each rib 135 and each groove 136 extending axially thereof.

The block 116 has a smooth, arcuately concave, pin blank supporting surface 140 having an axis of curvature coincident with the axis of rotation of the wheel 114, that is to say with the axis of the shaft 118. The concave surface 140 has coextensive therewith on each side thereof, a side wall 138 presenting an outwardly flared, pin blank forming surface 144. As will be apparent from a comparison of FIGS. 9 and 10, each surface 144 defines in relation to the concave surface 140, an obtuse angle which progressively increases from the upper (as seen in FIG. 7) end 146 of the surface 140, which end adjoins the track 110, towards the lower (as seen in FIG. 7) end 148 of the surface 140 which provides the upper (as seen in FIG. 7) edge of a vertical end face 150 of the block 116.

Figure 9:
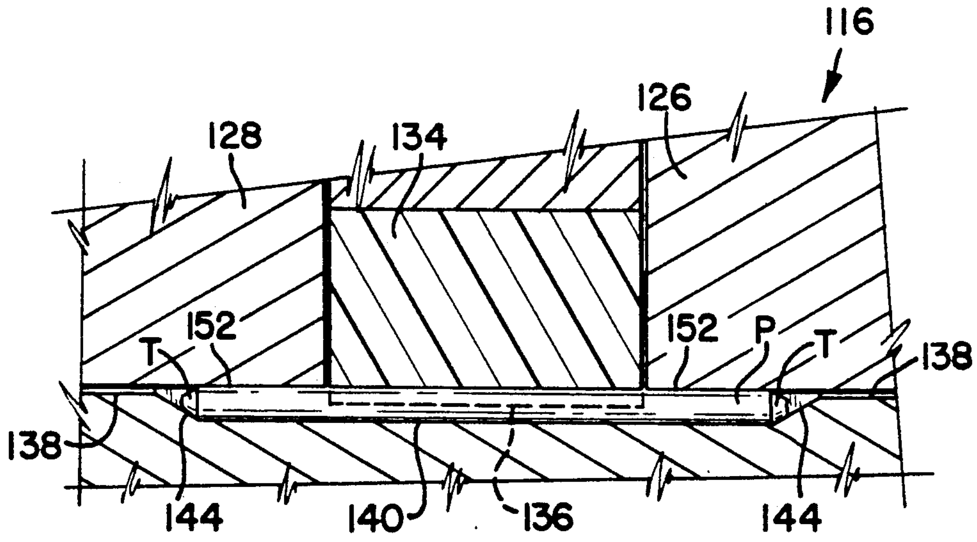
FIG. 9 is a view taken on the lines 9—9 of FIG. 7.
Figure 7:
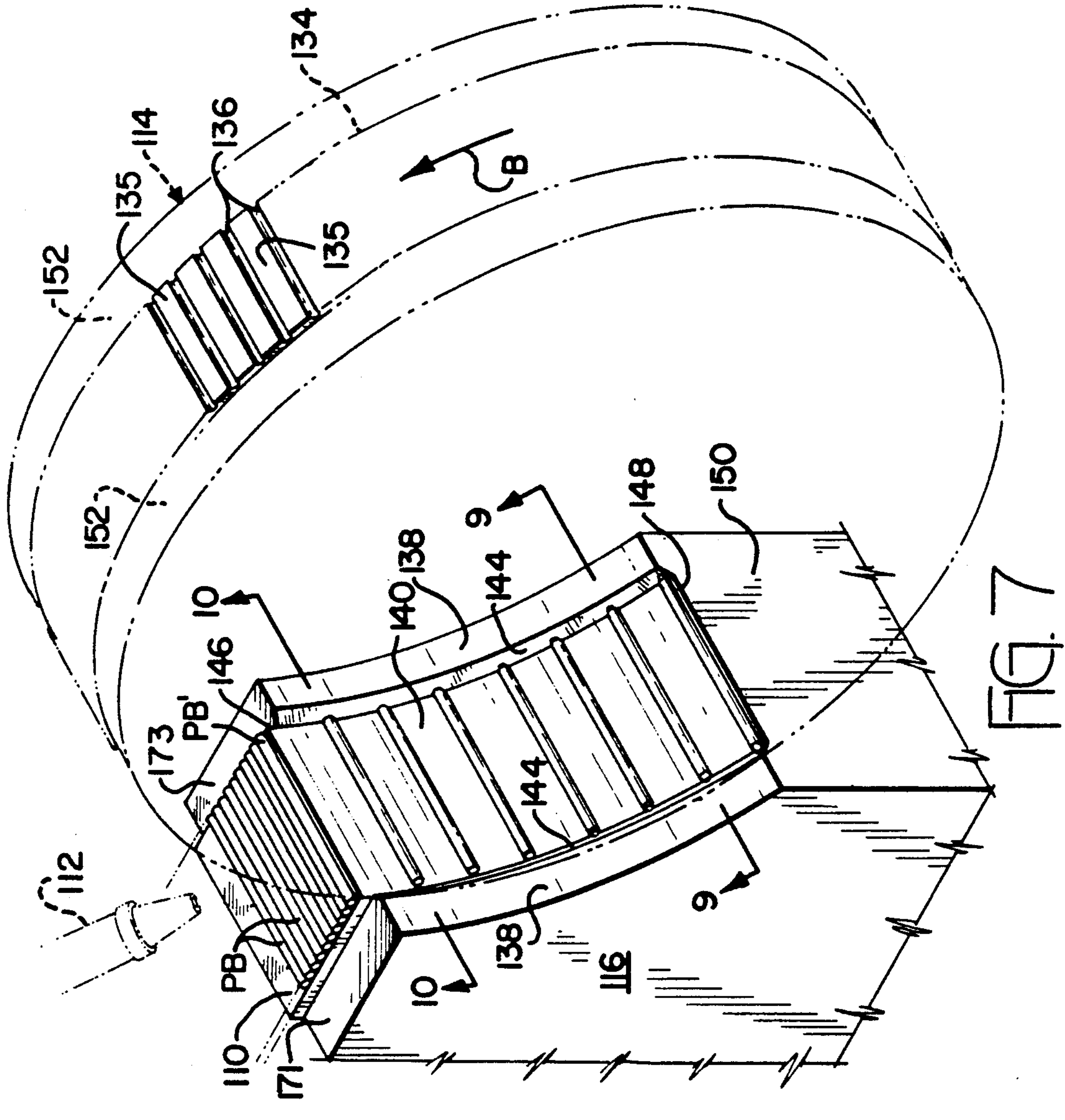
FIG. 7 is an enlarged, partly diagrammatic, isometric view of a pin blank rolling station of the apparatus.
Figure 1A:
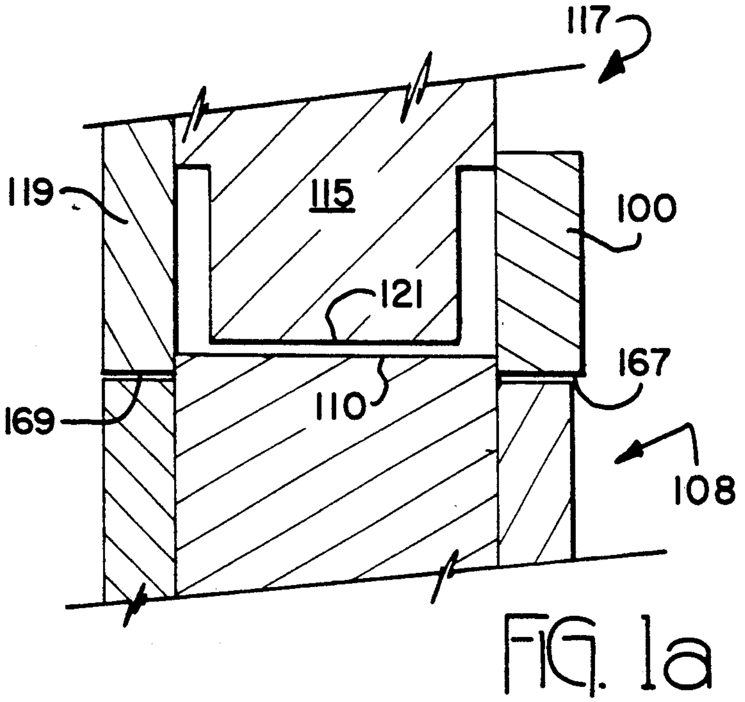
FIG. 1A is a fragmentary sectional view illustrating details of FIG. 1.
Figure 10:
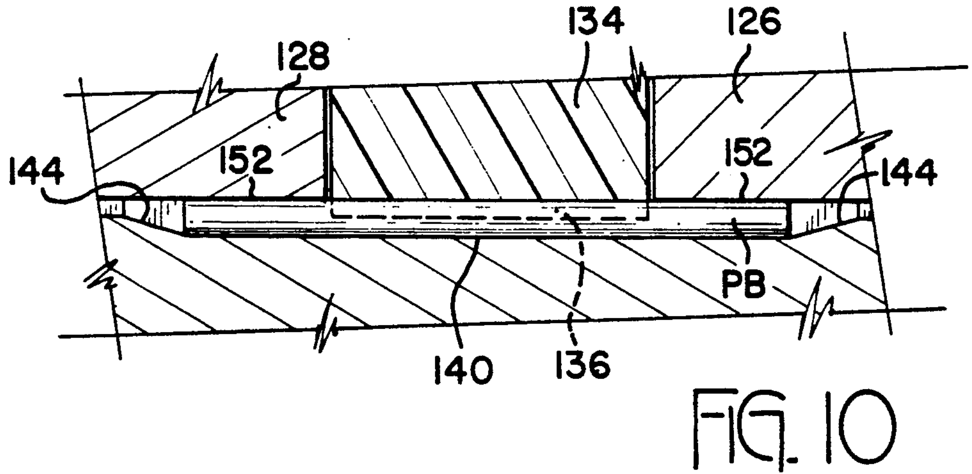
FIG. 10 is a view taken on the lines 10—10 of FIG. 7.

As best seen in FIGS. 2 and 7, the wheel 114 is supported over the block 116, by its shaft 118, with a portion of the circumference of the ring 134 opposite to and proximate to the surface 140 and with a portion of the circumference of each of the forming surfaces 152 opposite to and proximate to a respective one of the forming surfaces 144. As shown in FIGS. 9 and 10, the forming surfaces 114 diverge from each other towards the forming surfaces 152. The wheel 114 is stood on from the plate 82 by means of a spacer plate 153.

A pin blank rolling wheel drag bar 154, best seen in FIG. 1, has, at one end, an opening 156, through which the outer end of the shaft 118 rotatably extends, the other end of the bar 154 being pivoted to the plate 8 by means of an eccentric pivot pin 158 provided with a kerf, whereby the angular position of the pin 158 is adjustable, finely to adjust the spacing between the wheel 114 and the block 116. Also secured to the plate 82 by means of a pivot pin 160 is a finished pin, bifurcated, stripper plate 162 (FIG. 2) having tapered fingers 164, the tips of which are urged towards the surfaces 152 by means of a spring 166 surrounding the pin 160. The lower edges 167 and 169 (FIG. 1A) of the plates 100 and 119, respectively, lie proximate to respective upper edges 171 and 173 (FIG. 7) of the block 116, the face 121 of the block 125 lying proximate to the portion of the track 10 on the block 116, for guiding the pin blanks PB towards the wheel 114.

Figure 6:
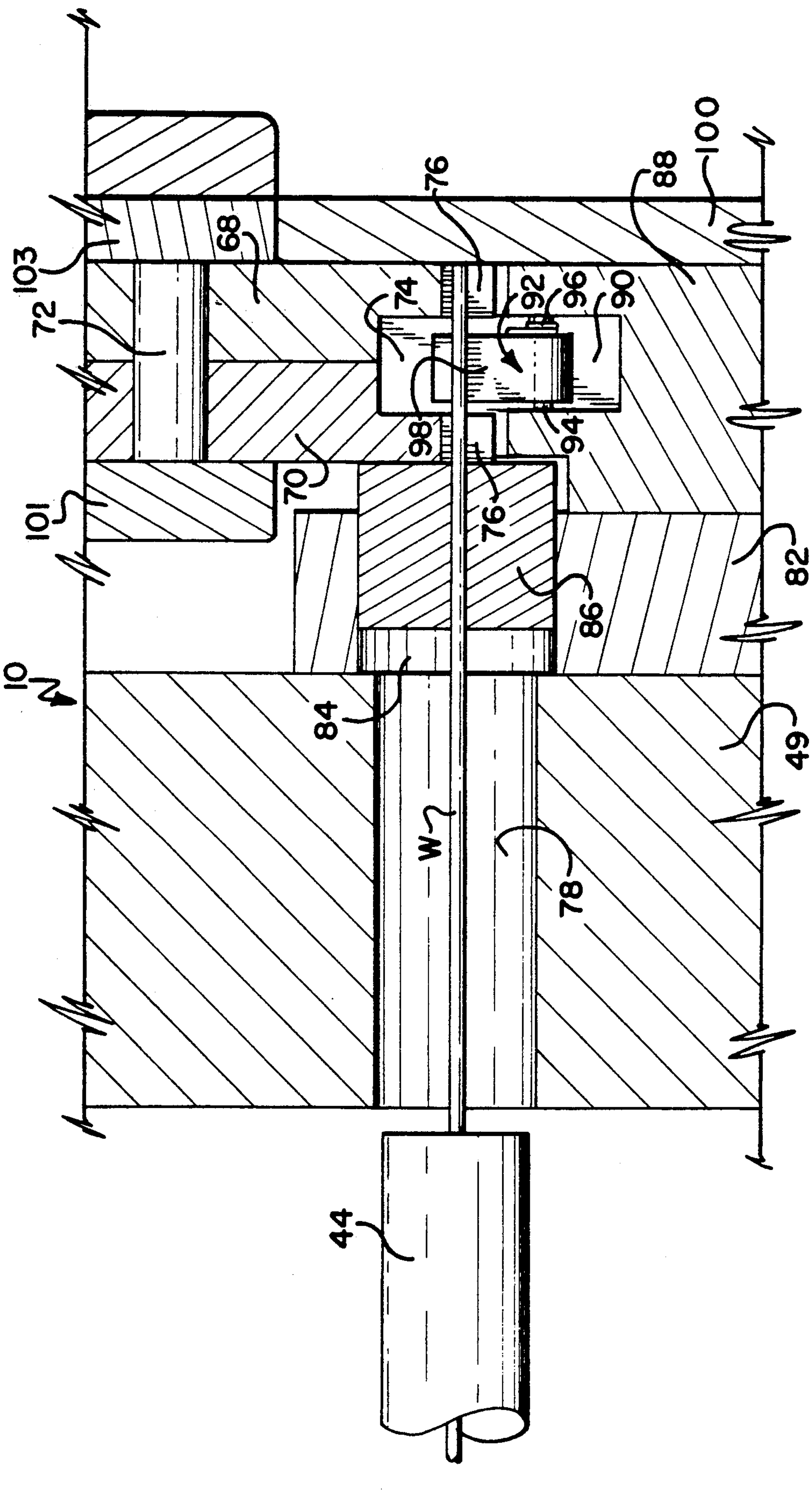
FIG. 6 is a view taken on the lines 6—6 of FIG. 2.

To set up the pin forming apparatus for operation, the motor 22 is operated to cause the wire W to be continuously driven through the guides 42 and 44 and the bushing 86, until its end abuts the stop plate 100, as best seen in FIG. 6. The motor 66 is not operated. However, the wire shearing wheel 46 is rotated manually so that the teeth 76 of the wheel half 70, shear one pin blank PB, in turn, from the wire W, in cooperation with the bushing 86, the wire feed rolls 18 and 40 slipping on the wire W during each shearing operation. Each blank PB so sheared, is held against the wheel 46 by the surface 98 of the pin hold down finger 92 and is carried by an opposed pair of teeth 76 of the wheel 48 onto the track 110, and is driven there along towards the station 6 by the next following pin blank PB sheared from the wire W. The shearing wheel 46 is rotated manually until the track 110 is fully occupied by a row of juxtaposed pin blanks PB, the blanks of the row adhering lightly to each other by virtue of the oil film that was applied to the wire W upstream of the wire guide 42.

In order to operate the apparatus, the motor 66 is actuated to rotate the wheels 46 and 114 under power, so that the row of blanks PB is driven towards the wheel 114 by one step each time the wheel 46 transfers a severed blank PB onto the track 110.

Figure 11:
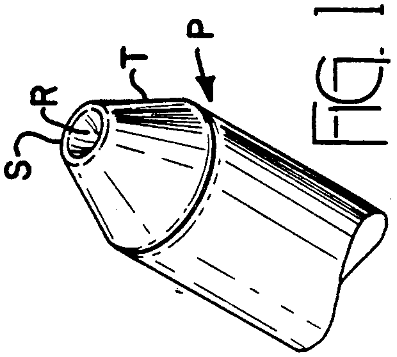
FIG. 11 is an enlarged three-dimensional view of an end portion of a pin made by means of the apparatus.

As each pin blank PB, which is in the form of a right circular cylinder, as best seen in FIG. 10, reaches the upper end 146 of the concave surface 140 of the block 116, and thus becomes the leading blank of the row of blanks on the track 110, said leading blank is forced by compressed air issuing from the nozzle 112, into an opposite groove 136 of the wheel 114, so as to be entrained ring 134. As the wheel 114 rotates it passes the pin blank on to the concave surface 140, as shown in FIG. 10 and between the surfaces 144, its entry there between being assisted by the wide angle guide mouth presented by the surfaces 144 at the end 146. Each pin blank PB, when received in a groove 136, is urged against the surface 140 by the abutting surfaces 152 of the wheel parts 126 and 128 and is rolled downwardly along the surface 140 so that the flat ends of the pin blank PB are formed by cooperation between the surfaces 144 and 152, as shown in FIG. 9, to frusto-conical shape in a progressive, cold rolling operation, to provide a finished pin P having a frusto-conical end portion tip T, as shown in FIG. 11. A pin P so formed has a blunt, smooth free end into which extends a conical recess R defined by a peripheral skirt S of the pin material thrown up by the cold rolling operation. Each pin that has been so formed, falls from the end 148 of the surface 140, into a bin (not shown), assisted by the tips of the fingers 164 of the stripper plate 162. The ring 134 is rotatable relative to the remainder of the wheel 114 to take account of the difference between the velocity of the periphery of a pin blank PB as it rolls along the surface 140 and the velocity of the travel of the pin blank PB along the surface 140. The wheel 46 is rotated at such speed that no more than one pin blank PB at a time is presented to each groove 136. The clutch 102 will slip should any pin blank PB back-up in the track 110, for example, if for some reason a pin blank PB does not enter a groove 136 or the wheel 114 jams for some other reason.

We claim:

1. Apparatus for manufacturing electrical pins having tapered end portions, comprising a frame; a wire feed station on the frame for feeding wire from a source of supply thereof in a wire feed direction; and a wire severing station positioned on the frame downstream in said wire feed direction, of the wire feed station; where said wire severing station comprises a rotary wire severing member cooperating with a fixed wire severing member on the frame, means for guiding wire fed by said wire feed station between said rotary and fixed wire severing members to be severed thereby to produce pin blanks from said wire; a pin blank rolling station on said frame, for rolling the end portions of said blanks to frusto-conical shape, said rolling station comprising a pin blank rolling fixture on the frame and a pin blank rolling wheel rotatably mounted to the frame for rotation relative to said rolling fixture for progressively cold rolling said end portions to frusto-conical shape in cooperation with said rolling fixture; and a pin blank track extending between said severing station and said rolling station, said rotary member having means for advancing pin blanks severed from the wire at the severing station, along the track, to position each blank in turn between said rolling wheel and said rolling fixture to enable them to cold roll said end portions of said blanks to frusto-conical shape.

2. Apparatus as claimed in claim 1, including a wire stop at said severing station, positioned upstream, in said wire feed direction, of said rotary member for arresting the leading end of the wire to enable it to be severed at a position back therefrom, between said rotary member and said fixed member, said rotary member having a slip clutch and said wire feeding station having wire feed rolls between which the wire can slip, said rolls, said rotary member and said rolling wheel being provided with continuously operated, constant speed drive means.

3. Apparatus as claimed in claim 1, wherein said rotary member is in the form of a wheel having a peripheral groove and a peripherally extending series of teeth on each side of said groove each tooth on one side of said groove being opposite to a tooth on the other side thereof so that the teeth are arranged in opposed pairs, said fixed severing member being in the form of a bushing receiving the wire there through and being positioned immediately adjacent to the periphery of the rotary member and upstream thereof in said wire feed direction, a wire stop plate being provided immediately adjacent to the periphery of the rotary member and downstream thereof in the wire feed direction, whereby the leading end of the wire fed from said wire feed station is repeatedly arrested by said stop plate and said wire is severed between said bushing and a tooth of said rotary member as the later is rotated, to provide a pin blank and said blank is carried by said tooth and the tooth opposite thereto, onto said track.

4. Apparatus as claimed in claim 3, including a pin blank hold down member for retaining said blank against said rotary member as said blank is carried toward said track by said teeth.

5. Apparatus as claimed in claim 1, wherein said pin blank rolling fixture has an arcuately concave pin blank receiving smooth surface having an axis of curvature and a pin blank forming first surface extending along each side of said pin blank receiving surface, said pin blank rolling wheel having a pin blank entraining peripheral surface and on each side thereof a pin blank forming second surface, for cooperation with a respective pin blank first forming surface of said rolling fixture to roll said end portions to frusto-conical shape.

6. Apparatus as claimed in claim 5, wherein said peripheral surface is provided on a ring mounted in said rolling wheel for rotation relative thereto about the axis of rotation of said rolling wheel.

7. Apparatus according to claim 5, wherein said peripheral surface is formed with a series of evenly spaced pin blank receiving grooves extending axially of said rolling wheel and being defined by resilient ribs projecting radially beyond the forming surfaces of said rolling wheel.

8. Apparatus according to claim 7, wherein said track is provided with an air blast nozzle for urging the leading blank on said track into one of said grooves when it is opposite thereto, during rotation of said rolling wheel.

* * * * *